United States Patent [19]

Bolen et al.

[11] 3,956,565

[45] May 11, 1976

[54] GLASS FIBERS COATED WITH A SILANIZED BUTADIENE POLYMER

[75] Inventors: Charles E. Bolen, Newark; Kevin M. Foley, Hebron; Frank Paul McCombs, Granville, all of Ohio

[73] Assignee: Owens-Corning Fiberglas Corporation, Toledo, Ohio

[22] Filed: Nov. 15, 1974

[21] Appl. No.: 524,112

Related U.S. Application Data

[63] Continuation of Ser. No. 347,298, April 2, 1973, abandoned.

[52] U.S. Cl. ............................. 428/378; 428/391; 428/392
[51] Int. Cl.² ..................... B32B 9/00; D02G 3/00
[58] Field of Search ........... 428/375, 378, 391, 392; 260/46.5 UA

[56] References Cited
UNITED STATES PATENTS

| | | | |
|---|---|---|---|
| 2,475,122 | 7/1949 | Barry et al. | 260/85.1 |
| 2,557,778 | 6/1951 | Barry et al. | 428/429 |
| 2,831,828 | 4/1958 | Brooks et al. | 260/41.5 A |
| 2,831,829 | 4/1958 | Brooks et al. | 260/41.5 A |
| 2,952,576 | 9/1960 | Wheelock | 260/46.5 UA |

OTHER PUBLICATIONS

Eaborn–Organosilicon Compounds (Butterworth's Scl. Pubns.) (London) (1960) pp. 299 & 328.
Sauer et al.–J. Am. Chem. Soc. 67, 1548–1549 (1945).

*Primary Examiner*—Lorraine T. Kendell
*Attorney, Agent, or Firm*—John W. Overman; Keith V. Rockey

[57] ABSTRACT

A composition for use in the treatment of glass fibers to promote a strong bonding relationship between glass fibers and plastics and elastomeric materials comprising a silanized butadiene polymer which has been reacted with a halosilane and the product reacted with an epoxide to replace the halogen groups of the silane with beta-haloalkoxy groups.

18 Claims, No Drawings

GLASS FIBERS COATED WITH A SILANIZED BUTADIENE POLYMER

This is a continuation of application Ser. No. 347,298, filed Apr. 2, 1973 and now abandoned.

This invention relates to a composition for use in the treatment of glass fibers, and more particularly to a composition for use in the treatment of glass fibers to improve the processing and performance characteristics of glass fibers for reinforcement of elastomeric materials and resins in the manufacture of glass fiber reinforced elastomeric products and in the manufacture of glass fiber reinforced plastics.

The term "glass fibers", as used herein, is intended to refer to and include (1) continuous fibers formed by rapid attenuation of hundreds of streams of molten glass and to strands formed when such continuous glass fiber filaments are gathered together as they are being formed; and to yarns and cords formed by plying and/or twisting a number of strands together, and to woven and non-woven fabrics which are formed of such glass fiber strands, yarns or cords, and (2) discontinuous fibers formed by high pressure steam, air or other suitable attenuating force directed onto multiple streams of molten glass issuing from a glass melting bushing or from an orifice containing spinner, and to yarns that are formed when such discontinuous fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

It is now common practice to combine glass fibers with elastomeric materials in the manufacture of glass fiber-reinforced elastomeric and resinous products. As is known to those skilled in the art, the glass fibers prior to combination with elastomeric materials or resinous materials are first coated with a size composition to improve the processing characteristics of the glass fibers and impart the desired degree of lubricity to the glass fibers and thus prevent destruction of the fibers through mutual abrasion, without destroying the fibrous characteristics of the glass fibers. Subsequent to application of the size coating or film to the individual glass fiber filaments, the glass fibers for use as reinforcement for elastomeric materials are frequently formed into strands, cords, yarns or fabrics, hereinafter referred to as bundles, for impregnation with an elastomer compatible adhesive, generally in the form of a blend of a resorcinol-aldehyde resin and an elastomer.

One of the distinguishing features of glass fibers as compared to other synthetic fibers stems from the fact that the glass fiber surfaces are highly hydrophilic in nature, with the result that a thin but tenacious film of moisture is formed on the glass fiber surfaces almost immediately as the glass fibers are formed. This film of moisture has a detrimental effect on establishing a secure bonding relationship between the glass fiber surfaces and elastomeric materials with which the glass fibers are combined in the manufacture of glass fiber reinforced elastomeric products.

It is now known to the art that the effect of the film of moisture referred to above on the bonding relationship between glass fibers and elastomeric or resinous materials can be minimized by formulating the treating or size composition to include an organo silicon compound, usually in the form of a hydrolyzable silane. While the use of such organo silicon compounds represents a distinct improvement in the art, such compounds are nevertheless subject to certain disadvantages. One disadvantage in the use of such silanes is their high cost which imposes economic limitations on the amount of the silanes which can be formulated into a size composition. In addition, it has been found that such silanes are frequently not chemically bonded to the film-forming component of the size composition and, consequently, the bond established between the film forming component and the individual glass fiber surfaces frequently does not have maximum strength.

It has also been proposed to introduce a silicon atom to the polymeric matrix in an attempt to increase the bonding strength of the film forming material to the glass fiber surfaces. For example, in U.S. Pat. No. 3,650,810 there is disclosed a component for a size composition in which an organo silane containing ethylenic unsaturation is copolymerized with butadiene and styrene, or with an alpha-olefin.

It has also been proposed to add a trihalosilane directly to polymeric butadiene whereby the trihalosilane simply adds across the ethylene double bond in accordance with the following:

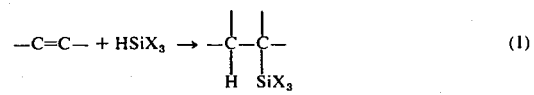
(1)

The primary difficulty with film forming polymeric materials prepared in this manner is that they are not stable, particularly in aqueous media, and consequently decompose to evolve HX (e.g., HCl) which has a detrimental effect on the treated fibers.

It is accordingly an object of the present invention to produce and to provide a method for producing a film forming material containing silicon atoms chemically bonded thereto which is stable against the release of hydrogen halides and which can be used to promote a secure bonding relationship between glass fibers and elastomeric or resinous materials in the manufacture of glass fiber reinforced elastomeric or resinous products.

It is a related object of the invention to provide glass fibers which have been treated with a polymeric material having silicon atoms chemically bonded therein to establish a secure bonding relationship between the glass fibers and elastomeric or resinous materials with which the treated glass fibers have been combined in the manufacture of glass fiber reinforced elastomeric or resinous products.

The concepts of the present invention reside in a film-forming polymeric material for use in the treatment of glass fibers in which a halosilane is added across the ethylenic double bond of an elastomeric polymeric and the remaining halogen atoms attached to the silicon atom are replaced, preferably by way of a beta-haloalkoxy group.

In the preferred practice of the present invention, an elastomeric polymer based on butadiene is first reacted with a halosilane containing at least one hydrogen atom bonded directly to the silicon atom to add the halosilane across the double bond. The product of this reaction is then further reacted with an epoxide. Without limiting the present invention as to theory, it is believed that the reaction product of the halosilane with the polymeric material results in a polymer including units

 (II)

and the epoxide

reacts with the remaining halogen atoms to form beta-haloalkoxy groups as follows

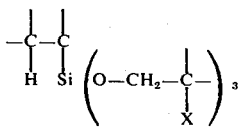 (III)

in the polymer matrix. The use of an epoxide is particularly advantageous in that the beta-haloalkoxy group which is formed not only prevents the evolution of HCl, but also serves to stabilize the resulting product from hydrolysis of the beta-chloroalkoxy group attached to the silicon atom. As will be appreciated by those skilled in the art, hydrolysis of the halogen atoms of the groups represented by (II) can lead to gelling of the polymer through crosslinking, particularly in aqueous media. It has been found, on the other hand, that the beta-haloalkoxy groups serve to stabilize the product of the reaction and render it significantly more resistant to hydrolysis.

The concepts of the present invention are applicable to elastomeric polymers and preferably polymers based upon butadiene, containing ethylenic unsaturation. Suitable polymers include homopolybutadiene, copolymers of butadiene and furfural, copolymers of butadiene and styrene, copolymers of butadiene and acrylonitrile, terpolymers of butadiene, styrene and acrylonitrile, terpolymers of butadiene, styrene and vinyl pyridine, copolymers of butadiene and maleic anhydride, copolymers of butadiene and alkyl acrylates and methacrylates in which the alkyl groups contain 1 to 4 carbon atoms. Such copolymers generally contain at least 55% butadiene, and preferably 60% butadiene. The chemical composition of the rubbery polymer is not critical so long as the polymer has at least 1.5 carbon-to-carbon double bonds per 1000 carbon atoms.

The average molecular weight of the polymer containing the ethylenic unsaturation is not a critical variable in the process of the invention. It has been found, however, that liquid polymers are simpler to react since no solvent is required. It is accordingly preferred to employ liquid polymers, that is polymers having a molecular weight less than 6000. Best results are usually achieved when use is made of polymers having an average molecular weight within the range of 300 to 5000, and preferably 500 to 3000. As will be appreciated by those skilled in the art, use can be made of higher molecular weight polymers by simply dissolving the polymer in a suitable inert organic solvent.

As the halosilane, use can be made of a variety of halosilanes containing at least one hydrogen atom bonded to the silicon atom and at least one halogen atom (and preferably chlorine or bromine) bonded to the silicon atom. Preferred silanes are those having the formula

 (IV)

wherein X is halogen, and preferably chlorine or bromine, and R is halogen as described above, hydrogen or an organic group. Preferred organic groups include $C_1$ to $C_6$ alkyl (e.g., methyl, ethyl, propyl, isopropyl, etc.); $C_2$ to $C_6$ alkenyl (e.g., vinyl, allyl, butenyl, etc.); an aryl group containing 6 to 10 carbon atoms (e.g., phenyl, tolyl, benzyl, naphthyl, etc.), cycloalkyl containing 4 to 8 carbon atoms (e.g., cyclopentyl, cyclohexyl, etc.) as well as halogen, hydroxy, etc. substituted derivatives thereof.

Representative of such silanes are trichlorosilane, tribromosilane, dichlorosilane, vinyldichlorosilane, allyldichlorosilane, methyldibromosilane, phenyldichlorosilane, cyclohexyldichlorosilane, chlorophenyldichlorosilane, etc.

Trihalosilanes are generally preferred for use in the practice of this invention. The organodihalosilanes are interesting reactants, and particularly the unsaturated dihalosilanes. It is believed that the reaction product between the polymer containing ethylenic unsaturation and such dihalosilanes include units

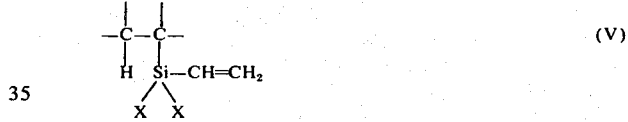 (V)

where R is vinyl, and this unsaturated group provides a reactive site for crosslinking of the polymer on curing.

The reaction between the silane and the polymer is carried out in the presence of a catalyst of the type conventionally employed in the reaction of unsaturated compounds with trichlorosilanes. The preferred catalyst is chloroplatinic acid, but use can also be made of other platinum catalysts including platinum on a charcoal support, $PtCl_4$, $PtCl_2$ and complexes formed between $PtCl_4$ and olefins such as ethylene or cyclohexene. In addition, use can also be made of organic amines.

The reaction is preferably carried out using the liquid polymer as the reaction medium although use can be made of an inert organic solvent if desired. Suitable solvents, when a solvent is employed, include saturated aliphatic hydrocarbons such as pentane, hexane, heptane; aromatic hydrocarbons such as benzene, toluene, xylene, etc., as well as numerous others. The reaction temperature is not critical and can be varied within wide limits. In general, higher reaction temperatures favor shorter reaction times. It has been found that good results are achieved with a reaction temperature within the range of 20° to 200°C although higher or lower temperatures can be employed depending upon the reaction time and on whether a solvent is used. If the polymer is a solid polymer, the use of a solvent for the polymer is essential.

A catalytic amount of the catalyst is usually sufficient to catalyze the reaction. For example, use can be made of 0.00005 to 0.001 mole of catalyst per mole of the silane, and preferably 0.0001 to 0.0005 mole of catalyst per mole of silane.

Reactant proportions are similarly not critical to the practice of the invention. It is generally sufficient that the halosilane be employed in amounts within the range of 0.1 to 50 parts by weight per 10 parts by weight of the polymer. As will be appreciated, use can be made of up to 1 mole of halosilane per mole of carbon-to-carbon double bonds in the polymer, if desired, to introduce the maximum number of silicon atoms into the polymeric matrix.

After reaction with the halosilane, the polymer is then reacted with an epoxide. In general, it is desirable to employ the epoxide in an amount sufficient to react with all of the halogen atoms bonded to the silicon atom, that is, one mole of epoxide per mole of halogen atoms bonded to silicon. Greater amounts of epoxide can be used although there is frequently no advantage in using such excesses. The reaction proceeds spontaneously although the reaction can be accelerated by the addition of heat. For best results, the reaction with the epoxide is carried out at a temperature within the range of 20° to 200°C.

As the epoxide, use can be made of a variety of mono- and diepoxides. preferred are alkylene oxides

   (VI)

wherein $R_2$ is halogen or an alkyl group containing 1 to 20 carbon atoms, and preferably 1 to 6 carbon atoms. Representative alkylene oxides include ethylene oxide, propylene oxide, butylene oxide, pentylene oxide, hexylene oxide, etc.

Also suitable for use in the practice of the invention are epoxides having the formula

   (VII)

wherein $R_3$ is an aryl group and preferably phenyl or phenyl substituted with an amino group, a halogen group, an alkyl group; alkyl containing 1 to 20 carbon atoms and substituted derivatives thereof; an alkenyl group containing 2 to 8 carbon atoms (e.g., vinyl, allyl, etc.); a group having the formula

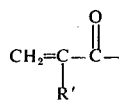

wherein R' is hydrogen or methyl. Illustrative of such epoxides are phenyl glycidyl ether, cresyl glycidyl ether, allyl glycidyl ether, glycidyl acrylate, glycidyl methacrylate, a mixture of n-octyl and n-decyl glycidyl ethers (Epoxide No. 7 from Procter and Gamble) and a mixture of n-dodecyl and n-tetradecyl glycidyl ethers (Epoxide No. 8 from Procter and Gamble).

Use can also be made of diepoxides, such as the following epoxides of the formula

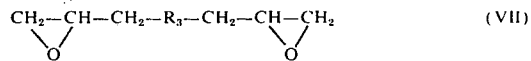   (VII)

wherein $R_3$ is a divalent organic radical such as oxyalkyleneoxy containing 1 to 10 carbon atoms; oxyalkyleneoxyalkyleneoxy containing 2 to 20 carbon atoms; divalent aromatic groups such as a group of the formula

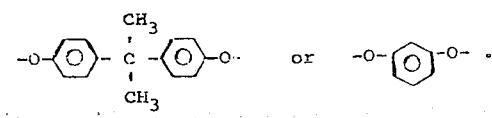

A number of such epoxides are commercially available from Dow and Ciba and include the following:

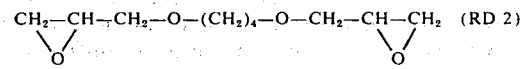   (RD 2)

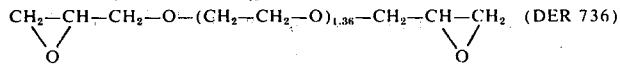   (DER 736)

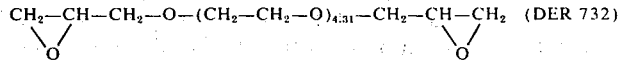   (DER 732)

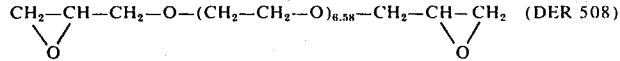   (DER 508)

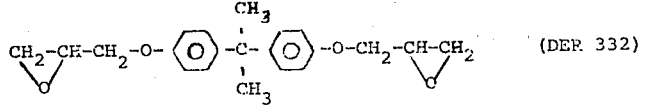   (DER 332)

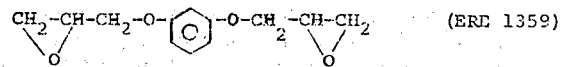   (ERL 1359)

Also suitable are cycloalkane epoxides, including the following:

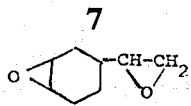

(RD 4 or ERL 4206)

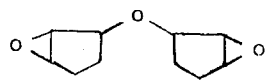

(ERR 4205)

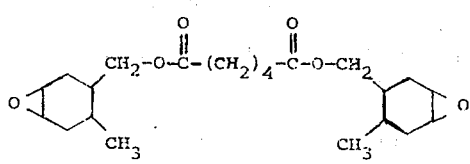

(ERR 4289)

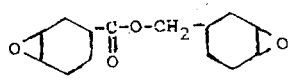

(ERR 4221)

In using epoxides containing more than one epoxide groups per mole, such as diepoxides, it is frequently desirable to employ the diepoxides in combination with a monoepoxide of the type described above to minimize gelling of the resulting product through cross-linking. It is preferred to employ the diepoxides combined in mole ratios less than 1:1 based upon the total number of halogen atoms contained in the silane, with the balance of the monoepoxide being sufficient to react with the halogen atoms of the halosilane. For best results, the ratio of the monoepoxide to diepoxide is 2:1 to 5:1.

Again, without limiting the present invention as to theory, it is believed that the epoxide or epoxides react with the halogen atoms attached to the silicon atom in accordance with the following:

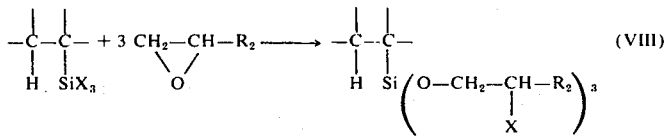

(VIII)

The resulting beta-haloalkoxy groups are believed to stabilize the product and provide improved adhesion between the product and hydrophilic surfaces such as those of glass fibers.

The resulting silicon modified polymer is particularly well suited for use as a fiber forming component in a glass fiber treating composition, such as a size composition. For this purpose, use can be made of an aqueous dispersion of the modified polymer alone or in combination with conventional additives in such compositions, such as glass fiber anchoring agents in the form of organo silicon compounds, emulsifying agents, glass fiber lubricants and the like. The silane modified polymer has been found to be quite effective in the establishment of a secure bonding relationship between glass fibers and resinous plastics and elastomeric materials in the manufacture of glass fiber reinforced plastics and elastomeric products.

A wide variety of conventional emulsifying agents can be used in the practice of the invention. Preferred are the nonionic emulsifying agents, such as the polyoxyethylene derivatives of fatty acid partial esters of sorbitol anhydrides or the polyoxyethylene derivatives of fatty alcohols containing 8 to 22 carbon atoms or of akyl substituted phenols wherein the alkyl groups contain 6 to 18 carbon atoms. Such emulsifiers are commercially available and include "Tween 80" from Atlas Chemical Industries, Inc. which is a polyoxyethylene derivative of the trioleate ester of sorbitan, "Tween 60" which is a polyoxyethylene derivative of the sterarate ester of sorbitan and available from Atlas, and the "Triton" series of emulsifiers from Rohm and Haas which are polyoxyethylene derivatives of alkyl-substituted phenols.

As will be appreciated by those skilled in the art, anionic and cationic emulsifying agents can also be used in the practice of the invention. Representative of such emulsifying agents are the alkali metal fatty acid sulfates (e.g. sodium lauryl sulfate), alkali metal salts of alkyl aryl sulfonates (e.g. sodium alkyl benzene sulfonates), as well as numerous others.

The size composition of the invention can be, if desired, formulated to include at least one glass fiber anchoring agent in the form of an organo silicon compound.

As the organo silicon coupling agent, use can be made of a very wide variety of silicon containing coupling agents known to those skilled in the art to be useful for this purpose. In general, suitable organo silicon compounds include organo silanes containing 1 to 3 readily hydrolyzable groups, such as halogen (bromine, chlorine, fluorine or iodine), or alkoxy having 1 to 6 carbon atoms, such as methoxy, ethoxy, propoxy, butoxy, etc., and containing at least one organic group attached directly to the silicon atom, with any remaining valences on the silicon atom being taken up by hydrogen. In aqueous solution, such silanes tend to hydrolyze to form the corresponding silanols and/or siloxanes and hence the anchoring agent is present in the aqueous size composition of the invention as the silane, silanol and/or siloxane.

The organic group or groups attached to the silicon atom can be any of a variety of groups including alkyl having 1 to 10 carbon atoms, such as methyl, ethyl, propyl, hexyl, etc.; alkenyl containing 2 to 8 carbon atoms, such as vinyl, allyl, etc.; cycloalkyl having 4 to 8 carbon atoms, such as cyclopentyl, cyclohexyl, etc.; aryl containing 6 to 15 carbon atoms, such as phenyl, naphthyl, benzyl, etc., and the halogen, amino, hydroxy, mercapto, glycidoxy or epoxy substituted derivatives thereof. It will be understood that wherein the organo silane contains more than one group, the various organic groups attached to the silicon atom can be the same or different from each other.

Representative of the compounds falling within the above group are ethyldichlorosilane, propyltrichlorosilane, n-butyltrimethoxysilane, gamma-aminopropyltrimethoxy silane, delta-aminobutyltriethoxysilane, bis-(gamma-aminopropyl)dimethoxy silane, delta-aminobutylethyldimethoxysilane, beta-hydroxyethyltriethoxysilane, glycidoxypropyltrimethoxysilane, gamma-chloropropyltrichlorosilane, vinyldichlorosilane, gamma-aminoallyltrimethoxy silane, beta-aminovinyltriethoxysilane, 3,4-epoxycyclohexyltrimethoxysilane, 3-aminocyclohexylethyltriethoxysilane, para-aminophenyltriethoxysilane, methacryloxypropyltrimethoxysilane, N-(beta-aminoethyl)gamma-aminopropyltrimethoxy silane, gamma-mercaptopropyltriethoxysilane, gamma-hydroxypropyltrimethoxysilane, as well as a variety of others. In general, those silanes preferred are those in which at least one organic group is substituted by at least one amino group.

One particularly preferred amino-substituted organo silane which has been found to provide excellent results in the practice of the present invention is a polyfunctional amino-substituted compound having the formula:

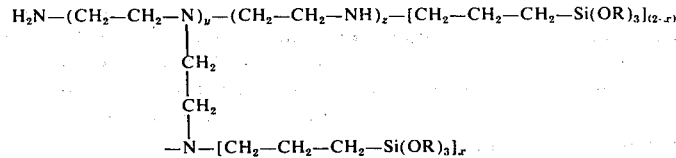

(IX)

wherein R is lower alkyl (e.g., methyl, ethyl, propyl), $x$ is an integer between 0 and 2, and $y$ and $z$ are integers. Compounds of the foregoing type are available from Dow Corning Corporation under the trademark Z-6050.

While the organo silicon compounds suitable for use as a coupling agent in accordance with the present invention have been described above with reference to the organo silane, it will be understood by those skilled in the art that the above may also be used in the form of the corresponding silanols and polysiloxane polymers.

It has been found that certain combinations of the foregoing organo silicon compounds in the composition of this invention provide unexpected superior results in the manufacture of glass fiber-reinforced elastomeric products. It is particularly advantageous to employ a combination of the polyfunctional amino-substituted compound designated Z-6050 with an amino-substituted alkyl silane of the formula $$H_2N - (CH_2)_w - SiZ_3 \quad (X)$$

where $w$ is an integer from 2 to 5 and Z is a readily hydrolyzable group as described above. Preferred is gamma-aminopropyltriethoxysilane.

Another combination of anchoring agents which have been found to provide good results in this invention is a substantially equimolar mixture of $$H_2N - CH_2 - CH_2NH - CH_2 - CH_2 - CH_2 - SiZ_3$$

and an alkyl silane, such as methyltriethoxy silane.

The relative proportions of the butadiene-based polymer, emulsifying agent and anchoring agent in the composition of this invention are not critical and can be varied within wide limits. It is generally preferred that the polybutadiene component range from 5 to 30 parts by weight of the composition on a dry basis, and preferably 7 to 25 parts by weight. The amount of emulsifying agent should be an amount sufficient to emulsify the polybutadiene and provide a stable system. It has been found that an amount within the range of 5 to 30 parts by weight on a dry or water-free basis is generally sufficient.

The total amount of anchoring agent can similarly be varied within wide ranges. Usually, an amount within the range of 1.0 to 15, and preferably 2 to 8, parts by weight on a dry or water-free basis is sufficient. When use is made of two or more anchoring agents, each is employed in a weight ratio of within the range of ⅓ to 3 based on the weight of each of the other anchoring agents.

Having described the basic concepts of the invention, reference is now made to the following examples which are provided by way of illustration, and not by way of limitation, of the practice of the invention.

EXAMPLE 1

This example illustrates the preparation of a silicon-modified polybutadiene in accordance with the concepts of the invention.

A quantity of 500 g of a liquid polybutadiene having an average molecular weight of 2700 (Lithene QH from Lithium Corporation of America) is placed in a 1 liter round bottom flask equipped with a mechanical stirrer, an addition funnel, thermometer and reflux condenser. There was added to the reaction vessel 37.44 cc (0.37 moles) of trichlorosilane and 5 ml of a solution of 10 g of chloroplatinic acid in 150 ml of isopropanol. The reaction mixture is heated to 80°C and an additional 0.25 mole of catalyst is added. The reaction is allowed to proceed until the reaction temperature reaches 175°C, several hours later.

Thereafter, 80 cc (1.145 moles) of propylene oxide are added to the reaction vessel, and the resulting mixture is heated to 60°C. for 1 hour.

The resulting product is a viscous liquid polybutadiene.

EXAMPLE 2

This example illustrates the use of the modified polybutadiene prepared in Example 1 as a film forming component in a glass fiber size.

A sample of 20 g of the polybutadiene prepared in Example 1 is emulsified with Tween 85 in water to provide the following size composition:

|                              | Parts by weight |
|------------------------------|-----------------|
| Modified polybutadiene       | 20              |
| Tween 85 (emulsifier)        | 20              |
| Water to solids content of 5% |                |

The amount of water employed in size compositions of the invention is generally an amount to provide a dry solids content within the range of 0.5 to 20% by weight. The size composition is applied to glass fibers in an amount sufficient to deposit from 0.1 to 10% by weight dry solids on the individual glass fiber filaments.

EXAMPLE 3

This example illustrates another size composition embodying the features of this invention.

A sample of 20 g of the modified polybutadiene prepared in Example 1 is formulated into the following composition:

|                                     | Parts by weight |
|-------------------------------------|-----------------|
| Tween 85 (emulsifier)               | 20.0            |
| Modified polybutadiene              | 20.0            |
| Gel agent (SA 1300)                 | 6.0             |
| Gamma-aminopropyltriethoxysilane    | 8.2             |
| Polyaminosilane (Z-6050)            | 4.2             |

Water constitutes the balance of the composition, and the amount of water is adjusted to provide the desired solids content as described above. The resulting composition can be applied to glass fibers to form a thin coating on the surfaces thereof to impart to the glass fibers the desired degree of lubricity and bonding with elastomeric materials and resins in the manufacture of glass fiber reinforced elastomeric or resinous products.

The size composition of the present invention is quite stable and can be stored over long periods of time if desired. The stability of the composition can be further improved by adding thereto a gel agent to adjust the viscosity to a desired level, preferably a viscosity of 100 to 300 cps, as shown in the above Example 3. The gel agent renders the composition thixotropic and thus provides the additional advantage of maintaining the composition on the glass fiber surfaces as the glass fibers are randomly whipped during the forming process.

As the gel agent, use can be made of a wide variety of materials having thixotropic properties. For this purpose, use is preferably made of gel agents formed of celulose or cellulose derivatives, including carboxymethyl cellulose as well as lower alkyl and lower alkylene glycol ethers of cellulose or methyl cellulose. For example, use can be made of the dimethyl ether of cellulose, the diethyl ether of cellulose, etc., wherein the alkyl in the ether contains 1 to 4 carbon atoms, including methyl, ethyl, propyl, etc. As indicated above, use can also be made of lower alkylene glycol ethers of cellulose and methyl cellulose wherein the glycol forming the ether contains 2 to 4 carbon atoms, including ethylene glycol, propylene glycol and butylene glycol. Representative of suitable cellulose and cellulose derivatives include dimethyl ether of cellulose, ethylene glycol ethers of cellulose, such as hydroxyethyl cellulose marketed by Dow Chemical Company under the trademark XD 1300, propylene glycol ethers of methyl cellulose, which are marketed by Dow Chemical Company under the trade name Methocel HG, methyl cellulose which is marketed by Dow under the trade name Methocel MC, and butylene glycol ethers of methyl cellulose which are marketed by Dow under the trade name Methocel HB. In addition to the cellulose-type gel agents described above, use can also be made of various other gel agents such as the crosslinked polyacrylamides marketed by Dow Chemical Company under the designation "SA 1300".

The amount of gel agent is not critical and is an amount sufficient to adjust the viscosity to within the desired range. An amount of gel within the range of 0.5 to 10 parts is generally sufficient.

EXAMPLE 4

This example illustrates a size composition embodying a glass fiber lubricant.

A modified polybutadiene emulsion is prepared using the procedure described in Example 1. The resulting polybutadiene is then formulated with a glass fiber lubricant to form the following:

|                                                        | Parts by weight |
|--------------------------------------------------------|-----------------|
| Modified polybutadiene from Example 1                  | 10.0            |
| Emulsifying agent (Tween 85)                           | 5.0             |
| Emulsifying agent (Tween 60)                           | 5.0             |
| Gamma-aminopropyltrimethoxysilane                      | 3.7             |
| Polyaminosilane (Z-6050)                               | 2.0             |
| Lubricant (Sulfonated mineral oil, Twitchell 7440 from Emery Chemicals) | 3.0 |

The balance of the composition is water which is present in an amount to adjust the solids content to within the range of 0.5 to 20% by weight. The composition of Example 4 can be applied to form a thin film coating in accordance with the procedure described in Example 2 in an amount sufficient to provide a dry coating constituting from 0.1 to 10% by weight of the fibers.

As desired, a wide variety of glass fiber lubricants can be used in accordance with the concepts of the present invention as illustrated in Example 4. Glass fiber lubricants are well known to those skilled in the art and include fatty acid amines containing 8 to 36 carbon atoms, such as lauryl amine, stearyl amine, palmityl amine, etc., solubilizable mineral oils, such as sulfonated mineral oils marketed by Emery (e.g. Twitchell 7440) and amides prepared by the reaction of a fatty acid containing 8 to 36 carbon atoms, such as lauric acid, palmitic acid, oleic acid, linoleic acid with poly(-polyoxyethylene) amines. Another lubricant which can be used in the present invention is an amide formed by the reaction of one of the fatty acids mentioned above with a polyamine having the formula:

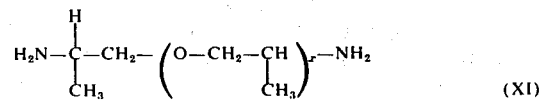

(XI)

wherein $x$ is an integer. Suitable amines of this type are marketed by Jefferson Chemical and have average molecular weights ranging up to about 2000. The reaction between the fatty acid and the polyamine can be conveniently carried out by admixing the amine with the acid in a molar ratio of at least 2 moles of acid per mole of amine, and heating the mixture to a temperature between 50°–100°C. However, it will be understood by those skilled in the art that a wide variety of other glass fiber lubricants in addition to those specifically described above can be used in accordance with the concepts of the present invention. Similarly, it is possible, and sometimes desirable, to use mixtures of the foregoing lubricants where use is made of a lubricant.

Additional silicon-containing polybutadienes and treating compositions embodying the same are illustrated by way of the following examples.

EXAMPLE 5

Using the procedure described in Example 1, a liquid copolymer of butadiene and styrene containing 75% butadiene and 25% styrene and having an average molecular weight of 2600 is reacted with trichlorosilane in a ratio of 1 part by weight of trichlorosilane per 10 parts by weight of the copolymer in the presence of chloroplatinic acid.

After the reaction is completed, a stoichiometric excess of butylene oxide is added to the reaction vessel. The product of the reaction is a highly viscous liquid silicon-modified butadiene-styrene copolymer.

EXAMPLE 6

Using the procedure described in Example 1, a liquid copolymer of butadiene and acrylonitrile containing 70% butadiene and 30% acrylonitrile and having an average molecular weight of 1700 is reacted with trichlorosilane in a ratio of 1 part by weight of the halosilane per 12 parts by weight of the copolymer in the presence of a platinum catalyst.

After the reaction is completed in about 6 hours, a stoichiometric excess of Epoxide No. 7 from Procter and Gamble is added to the reaction vessel. The resulting product is a silicon-modified butadiene-acrylonitrile copolymer.

EXAMPLE 7

A quantity of 500 g of a liquid terpolymer containing 70% butadiene, 20% styrene and 10% vinyl pyridine having an average molecular weight of 2300 is reacted with trichlorosilane in a ratio of 1 part by weight of halosilane per 15 parts by weight of the terpolymer in the presence of the catalyst described in Example 1.

The resulting product is then reacted with a stoichiometric amount of allyl glycidyl ether. The product is a viscous terpolymer.

EXAMPLE 8

Using the procedure described in Example 1, a liquid copolymer of 80% butadiene and 20% maleic anhydride having an average molecular weight of 2470 is reacted with trichlorosilane in a ratio of 1 part by weight of halosilane per 13 parts by weight of the copolymer in the presence of a chloroplatinic acid catalyst.

The product of the reaction is then reacted with a slight stoichiometric excess of propylene oxide to form a viscous silicon-modified copolymer.

EXAMPLE 9

A homopolymer of butadiene having an average molecular weight of 750 (Lithene QL) is reacted with trichlorosilane in a ratio of 1 part by weight of silane per 8 parts by weight of the polymer. The resulting product is then reacted with a stoichiometric amount of a mixture of propylene oxide and the diepoxide DER 332 described above, with the mixture containing 0.2 mols of the diepoxide per mole of propylene oxide.

The product is a viscous liquid polybutadiene.

EXAMPLE 10

A polybutadiene having an average molecular weight of 2300 (Lithene AH) is reacted with allyldichlorosilane in a weight ratio of 1 part of silane per 10 parts by weight of the polymer using the procedure described in Example 1.

The resulting product is then reacted with propylene oxide in a mole ratio of 2.1 moles of propylene oxide per mole of halosilane used.

The product is a syrupy liquid.

EXAMPLE 11

The terpolymer of butadiene, styrene and vinyl pyridine described in Example 7 is reacted with phenyldichlorosilane in a ratio of 1 part of silane per 10 parts of polymer using the procedure of Example 1. The product is then reacted with p-aminophenyl glycidyl ether in a mole ratio of 2 moles of ether per mole of silane employed.

The product is a highly viscous liquid.

Size compositions embodying the modified polybutadienes of Examples 5 to 11 are illustrated by the following:

EXAMPLE 12

|  | Parts by weight |
|---|---|
| Modified butadiene polymer of one of Examples 5 to 11 | 10 |
| Emulsifying agent | 10 |
| Water to solids content of 0.1 to 20% | |

EXAMPLE 13

|  | Parts by weight |
|---|---|
| Modified butadiene polymer of one of Examples 5 to 11 | 10 |
| Emulsifying agent | 10 |
| Organo silicon compound anchoring agent | 3 |
| Water to solids content of 0.1 to 20% | |

EXAMPLE 14

|  | Parts by weight |
|---|---|
| Modified butadiene polymer of one of Examples 5 to 11 | 10 |
| Emulsifying agent | 10 |
| Organo silicon compound anchoring agent | 5 |
| Lubricant and/or gel agent | 5 |

Each of the compositions of Examples 12 to 14 containing any one of the modified butadiene polymers of Examples 5 to 11 can be applied to glass fibers as a size, preferably as the glass fibers are formed. Alternatively, the treating compositions of this invention can also be employed as impregnating compositions for application to a bundle of glass fibers whereby the solids of the impregnant serve to penetrate the bundle and coat the fibers while separating the fibers each from the other. In the formulation of such impregnating compositions it is generally desirable to employ a high solids content, preferably a solids content of 10 to 50% by weight, to maximize the solids loaded onto the bundle.

The glass fibers treated with the compositions of Examples 1 to 14 can be used in the formation of textiles, such as woven and non-woven fabrics, in accordance with conventional processing techniques. Alternatively, the fibers treated with one of the compositions of Examples 1 to 14 can be directly combined with plastic resins in the manufacture of glass fiber reinforced plastics, laminates, coated fabrics and the like. The thin film coating of the invention on the surfaces of the individual glass fiber filaments operates to securely anchor the glass fibers to the plastic resin. Resins used in the manufacture of such products are well known to those skilled in the art, and are generally thermoplastic and thermosetting resins, including polyesters, polyepoxides, etc.

In the preferred use, glass fibers which have been treated in accordance with the present invention are employed as reinforcement for elastomeric materials in the manufacture of glass fiber-reinforced elastomeric products such as tires, drive belts, V-belts, etc. Glass fibers having a size coating thereon embodying the concepts of this invention can be combined directly with elastomeric materials without further processing whereby the coating formed of the modified butadiene polymer serves to securely bond the glass fiber surfaces to the elastomeric material.

The polybutadiene component of the coating is capable of undergoing curing and/or vulcanization with the elastomeric material constituting the continuous phase. However, it is frequently preferred to form the fibers treated with the size composition of this invention into cords formed of two or more strands of sized fibers which have been plied and twisted together, yarns, threads or fabrics, referred to as bundles, and subject the bundles of sized fibers to impregnation with an elastomer compatible material.

As the elastomer compatible material, use is preferably made of a blend of a resorcinol-aldehyde resin and an elastomer; such impregnating compositions are now well-known to those skilled in the art and are described in U.S. Pat. Nos. 3,391,052; 3,402,064; 3,424,608; 3,506,476; 3,533,830; 3,567,671 and 3,591,357 as well as numerous others. While the relative proportions of the components are not critical to the practice of this invention, it is generally preferred that such blends contain 2 to 10 parts by weight of the resorcinol-aldehyde resin per 15 to 100 parts by weight of the elastomer.

The use of such impregnating compositions is illustrated by way of the following examples.

EXAMPLE 15

Glass fibers which have been sized with the composition of Example 2 are formed into bundles formed of strands of glass fibers which have been plied and twisted together, and the resulting bundles are subjected to impregnation in a conventional manner as described in U.S. Pat. No. 3,424,608 with the following impregnating composition formulated in accordance with U.S. Pat. No. 3,567,671:

| Impregnating Composition | Total parts by wt. |
|---|---|
| Resorcinol-formaldehyde resin latex (Penacolite R 2170 - 75% solids) | 48 |
| Vinyl pyridine-butadiene-styrene terpolymer latex (Gentac FS - 42% solids) | 900 |
| Vinyl chloride-vinylidene chloride copolymer latex (Dow Latex 874 - % solids) | 350 |
| Microcrystalline paraffin wax (Vultex Wax Emulsion No. 5 - 56% solids) | 100 |
| Water | 832 |

Impregnation with the above composition is carried out to deposit in the glass fiber bundle dry solids constituting 10 to 30% by weight of the glass fiber system.

It has been found that even superior results are obtained where the vinyl chloride-vinylidene chloride copolymer in the above impregnant is replaced by a dicarboxylated butadiene-styrene copolymer. Such copolymers are commercially available from Goodyear under the trademark "Pliolite", such as Pliolite 4121. The use of such a composition is illustrated by the following.

EXAMPLE 16

Bundles of glass fibers in which the individual glass fibers have been sized with the composition of Example 3 are impregnated with the following:

| Impregnating Composition | Total parts by wt. |
|---|---|
| Resorcinol-formaldehyde resin latex (Penacolite R 2170 - 75% solids) | 48 |
| Vinyl pyridine-butadiene-styrene terpolymer latex (Gentac FS - 42% solids) | 900 |
| Dicarboxylated butadiene-styrene copolymer latex (Pliolite 4121 - 50% solids) | 350 |
| Microcrystalline paraffin wax (Vultex Wax Emulsion No. 5 - 56% solids) | 100 |
| Water | 832 |

Bundles of glass fibers which have been sized with any of the compositions of Examples 11 to 14 can be subjected to impregnants of the following general examples.

EXAMPLE 17

| | Parts by wt. solids |
|---|---|
| Resorcinol-formaldehyde resin | 2 – 10 |
| Vinyl pyridine-butadiene-styrene terpolymer | 20 – 60 |
| Vinyl chloride-vinylidene chloride copolymer or dicarboxylated butadiene-styrene copolymer | 15 – 40 |
| Microcrystalline paraffin wax | 2 – 30 |

EXAMPLE 18

| | Parts by wt. solids |
|---|---|
| Resorcinol-formaldehyde resin | 2 – 10 |
| Vinyl pyridine-butadiene-styrene terpolymer | 20 – 60 |

EXAMPLE 19

| | Parts by wt. solids |
|---|---|
| Resorcinol-formaldehyde resin | 2 – 10 |
| Natural rubber | 20 – 60 |

The balance of the foregoing compositions is water and the amount of water is adjusted to provide a solids content within the range of 20 to 55% by weight. Application of the impregnating composition is usually made in an amount sufficient to deposit in the sized fiber bundle dry solids constituting from 10 to 25% by weight of the fiber system.

In facilitating the combination of glass fibers treated in accordance with the present invention with elastomeric materials, the individual glass fibers containing a coating on the surfaces thereof from Examples 1 to 14 or bundles of glass fibers sized with one of the compositions of Examples 1 to 14, and impregnated as described above, are mixed with elastomeric material or otherwise laid down in the desired arrangement for combination with the elastomeric material, as in the manufacture of glass fiber-reinforced belts or in the manufacture of rubber tires reinforced with cords of glass fibers. The combination of glass fibers and elastomeric material is processed in a conventional manner by mold or cure under heat and compression or vulcanized for advancement of the elastomeric material to a cured or vulcanized stage while in combination with the treated glass fibers or bundles of glass fibers whereby the glass fibers or bundles of glass fibers becomes strongly integrated with the elastomeric materials in the glass fiber-elastomeric product.

In the final system, the elastomeric material with which the glass fibers or bundles of glass fibers are combined, constitutes a continuous phase. Such continuous phase elastomeric materials may comprise elastomers or rubbers of the type incorporated into the treating compositions or the elastomeric material can differ therefrom. It is believed that the tie-in between the individually coated glass fibers or the impregnated bundles of glass fibers and the elastomeric materials forming the continuous phase occurs primarily during cure or vulcanization of the elastomeric material in combination with the treated glass fibers.

It will be apparent that various changes and modifications can be made in the details of procedure, formulation and use without departing from the spirit of the invention, especially as defined in the following claims.

We claim:

1. Glass fibers having a coating thereon, said coating comprising a polybutadiene prepared by first reacting a butadiene homopolymer or copolymer having an average molecular weight less than 6000 and containing at least 1.5 carbon-to-carbon double bonds per 1000 carbon atoms with a halosilane having the formula

wherein X is halogen and R is selected from the group consisting of halogen, hydrogen and an organic group, in the presence of a catalyst capable of causing addition of an H-Si group across an ethylenic double bond, the amount of the halosilane being sufficient to constitute one mole of halosilane per mole of carbon-carbon double bond in the homopolymer or copolymer, said amount being within the range of 0.1 to 50 parts by weight of halosilane per 10 parts by weight of the homopolymer or copolymer, and reacting the product with an epoxide selected from the group consisting of an alkylene oxide, an epoxide having the formula

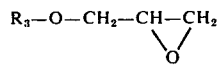

wherein $R_3$ is an organic group, a diepoxide having the formula

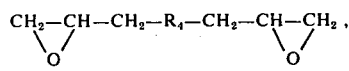

a cyclohexane epoxide and mixtures thereof, with the amount of the epoxide being sufficient to react with all of the halogen atoms bonded to the silicon atoms.

2. Glass fibers as defined in claim 1 wherein the coating also includes a glass fiber anchoring agent selected from the group consisting of organo silanes, their hydrolysis products and combinations thereof.

3. Glass fibers as defined in claim 1 wherein the coating contains a glass fiber lubricant.

4. Glass fibers as defined in claim 1 wherein the coating is a coating on the individual glass fiber surfaces.

5. Glass fibers as defined in claim 1 wherein the epoxide is an alkylene oxide.

6. Glass fibers as defined in claim 1 wherein the glass fibers are in the form of a bundle of glass fibers and said coating constitutes an impregnant in the bundle.

7. Glass fibers as defined in claim 6 wherein the individual glass fibers forming the bundle have a thin size coating on the surfaces thereof.

8. Glass fibers as defined in claim 6 wherein the glass fibers forming the bundle are in the form of strands which have been plied and twisted together to form a cord.

9. A glass fiber bundle comprising a plurality of glass fibers, a thin coating on the individual glass fiber filaments comprising a polybutadiene prepared by first reacting a butadiene homopolymer or copolymer having an average molecular weight less than 6000 and at least 1.5 carbon-to-carbon double bonds per 1000 carbon atoms with a halosilane having the formula

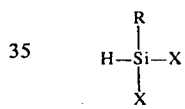

wherein X is halogen and R is selected from the group consisting of halogen, hydrogen and an organic group, in the presence of a catalyst capable of causing addition of a H-Si group across an ethylenic double bond, the amount of the halosilane being sufficient to constitute one mole of halosilane per mole of carbon-carbon double bond in the homopolymer or copolymer, said amount being within the range of 0.1 to 50 parts by weight of halosilane per 10 parts by weight of the homopolymer or copolymer, and reacting the product with an epoxide selected from the group consisting of an alkylene oxide, an epoxide having the formula

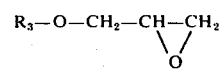

wherein $R_3$ is an organic group, a diepoxide having the formula

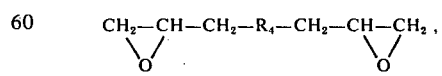

a cyclohexane epoxide and mixtures thereof, and an impregnant in the bundle, said impregnant comprising an elastomer compatible material, with the amount of the epoxide being sufficient to react with all of the halogen atoms bonded to the silicon atoms.

10. A bundle as defined in claim 9 wherein the elastomer compatible material comprises a blend of a resorcinol-aldehyde resin and an elastomer.

11. A bundle as defined in claim 9 wherein the elastomer compatible material comprises a blend of a resorcinol-aldehyde resin, a butadiene-styrene vinyl pyridine terpolymer, a polymeric material selected from the group consisting of a vinyl chloride-vinylidene chloride copolymer and a carboxylated butadiene-styrene copolymer, and an incompatible wax.

12. A bundle as defined in claim 11 wherein the polymeric material is a carboxylated butadiene-styrene copolymer.

13. A bundle as defined in claim 12 wherein the carboxylated copolymer is a dicarboxylated butadiene-styrene copolymer.

14. A bundle as defined in claim 11 wherein the polymeric material is a vinyl chloride-vinylidene chloride copolymer.

15. A bundle as defined in claim 9 wherein the halosilane is a trihalosilane.

16. A bundle as defined in claim 9 wherein the epoxide is an alkylene oxide.

17. A bundle as defined in claim 9 wherein the coating also includes a glass fiber anchoring agent selected from the group consisting of organo silanes, their hydrolysis products and combinations thereof.

18. A bundle as defined in claim 9 wherein the glass fibers forming the bundle are in the form of strands which have been plied and twisted together to form a cord.

* * * * *